United States Patent
Ovshinsky et al.

(10) Patent No.: US 6,737,194 B2
(45) Date of Patent: *May 18, 2004

(54) NON-PYROPHORIC HYDROGEN STORAGE ALLOY

(75) Inventors: Stanford R. Ovshinsky, Bloomfield Hills, MI (US); Rosa T. Young, Bloomfield Hills, MI (US); Baoquan Huang, Troy, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/268,834

(22) Filed: Oct. 10, 2002

(65) Prior Publication Data

US 2003/0051778 A1 Mar. 20, 2003

Related U.S. Application Data

(63) Continuation of application No. 09/873,863, filed on Jun. 4, 2001, now Pat. No. 6,517,970.

(51) Int. Cl.$^7$ .................................. H01M 4/58
(52) U.S. Cl. .............. 429/218.2; 420/583; 420/584.1; 420/588; 420/900; 148/442
(58) Field of Search ............... 429/218.2; 420/583, 420/584.1, 588, 900; 148/442

(56) References Cited

U.S. PATENT DOCUMENTS

| | | | | |
|---|---|---|---|---|
| 5,104,617 A | * | 4/1992 | Fetcenko et al. | 420/588 |
| 5,277,999 A | * | 1/1994 | Ovshinsky et al. | 429/59 |
| 5,407,761 A | * | 4/1995 | Ovshinsky et al. | 429/59 |
| 5,888,317 A | * | 3/1999 | Lee et al. | 148/424 |
| 6,517,970 B2 | * | 2/2003 | Ovshinsky et al. | 429/218.2 |

FOREIGN PATENT DOCUMENTS

JP  8-302442  * 11/1996

* cited by examiner

*Primary Examiner*—Laura Weiner
(74) *Attorney, Agent, or Firm*—Frederick W. Mau, II; David W. Schumaker; Marvin S. Siskind

(57) ABSTRACT

A low temperature hydrogen storage alloy which is not pyrophoric upon exposure to ambient atmosphere, particularly even after hydrogen charge/discharge cycling.

18 Claims, 4 Drawing Sheets

NON-PYROPHORIC HYDROGEN STORAGE ALLOY

RELATED APPLICATIONS

The present invention is a continuation of Ser. No. 09/873,863, now U.S. Pat. No. 6,517,970, which is assigned to the same assignee as the current application, entitled "Non-pyrophoric Hydrogen Storage Alloy", filed Jun. 4, 2001, the disclosure of which is hereby incorporated by reference.

FIELD OF THE INVENTION

This invention relates to alloys in which hydrogen may be stored, more particularly to such alloys or materials which are non-pyrophoric on exposure to ambient atmosphere, and most particularly to such non-pyrophoric alloys which may have a heterogeneous spectrum of hydrogen bonding energies.

BACKGROUND OF THE INVENTION

Hydrogen, generally considered to be the ultimate fuel, presents numerous potential benefits to be realized as well as numerous difficulties to be overcome. With capacity to serve as a fuel for combustion engines, other processes in which heat energy is derived from combustion and used; as well as a direct source of electrochemical energy in direct conversion processes such as, for example, those used in electrochemical fuel cells, hydrogen presents opportunities for production of energy without the creation of waste products bearing disposal difficulties.

The products of hydrogen combustion, whether thermal or electrochemical, are energy and water. Neither of these is toxic, neither presents difficulties of disposal of greenhouse gases, soot, or radioactive waste. From the standpoint of being a useful, high-energy content fuel, hydrogen is an excellent candidate for most of the uses in which fossil fuels are currently used. When used for direct conversion to electrical energy in a fuel cell, hydrogen does not yield oxides of carbon which often poison catalytic material used in such electrochemical cells, nor is radioactive waste generated as is the case with electricity-supplying nuclear-powered generators.

With these tremendous benefits accruing to its use as a fuel, some burdens in the use of hydrogen as a fuel may be expected. They are present and provide challenge to overcome. The greatest difficulties with hydrogen as a fuel lie in its containment and transportation. Hydrogen may be liquefied but there is tremendous cost involved in cooling and compressing; additionally the containment vessel cannot be completely sealed; tremendous losses are incurred through evaporation. Compression of the gas itself is costly, although not nearly so much as liquefication, and requires stout, durable, and heavy containers. Both are inefficient forms of storage in terms of energy storage per unit volume. Other storage means are would be useful.

Storage of hydrogen as a solid is appealing as enhanced volumetric efficiency is available. Various metals and metal alloy compositions are available for storage of hydrogen within the metallic crystal lattice; generally as a hydride. Such materials will generally release heat upon charging, take-up of hydrogen, absorption of hydrogen, or hydriding. Conversely, heat is necessary to release stored hydrogen from the metallic structure. The important reversible reaction to keep in mind is:

in which M is a metal or metal composition in which hydrogen may be stored. And H is atomic hydrogen. Generally something serving to catalyze the breakup of hydrogen molecules into hydrogen atoms will be helpful prior to this reaction.

There are two general types of hydrogen-storage alloys available. These are the so-called "high-temperature alloys" and the "low-temperature alloys". The heat of reaction for the reversible transition provided above is the basis for the differentiation and the basis of the invention described here. As a general matter, magnesium-based hydrogen storage alloys are high-temperature alloys as they generate a great deal of heat during hydriding and require a similar amount of heat to reverse the reaction and release hydrogen; their storage capacities are generally beyond about 5% by weight.

Low temperature alloys, generally transition-metal based and often of the $AB_2$ structure, generate less heat during charging or hydriding, require less heat to release hydrogen, and have storage capacities generally around or below about 2% hydrogen by weight. Such alloys will normally release hydrogen at ambient temperatures simply by opening a valve and on whatever container is used for containment of the storage material, thereby reducing the hydrogen pressure around the storage material or alloy which in turn drives the previous reaction forward.

Either of the two broad categories of hydrogen storage alloys will generally have enhanced hydrogen take-up or absorption with greater effective surface area or smaller particle size. Another possible reaction exists with these alloys, particularly the low-temperature alloys:

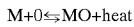

Again, for this reaction to proceed forward, something will normally catalyze the dissociation of molecular oxygen to atomic oxygen. This can be and generally is a competing reaction with the hydriding/dehydriding reactions. Normally, the oxygen absorption by the alloy will occur preferentially when available, since the oxides of the storage metals provide a lower energy ground state than do the hydrides. Attainment of a lower energy ground state involves evolution of greater heat than a higher energy ground state, the forward reaction above generates tremendous heat. Such heat generation is the basis of the need for the current invention.

The low temperature alloys, particularly in light of their easy acceptance of oxygen and rapid formation of oxides, likely will release tremendous amounts of heat upon exposure to ambient atmosphere. Such rapid release of heat yields a material which can easily heat to glowing red almost instantaneously and burst into flames and/or ignite other material nearby whose ignition temperature is at or below the temperature of the glowing metal. These alloys or hydrogen storage materials because of their affinity for oxygen are normally simply pyrophoric. Such pyrophoricity means that the materials must be treated with respect and handled with care under non-reactive atmosphere. Even more important, from the standpoint of distribution and enhancement of hydrogen storage capacity, the pyrophoric nature of these materials require special handling (read: more costly) in transportation. The means by which they may be shipped is also severely circumscribed; generally, for example, such materials normally may not be shipped by air in light of their pyrophoric nature. Thus, the pyrophoric nature of some hydrogen storage alloys is one of the main safety issues concerning the commercial use of hydrogen storage in hydride alloy form.

Here we specifically describe the basic means in which multi-elemental hydrogen storage materials are atomically engineered and designed into non-pyrophoric hydrogen storage alloys by considering them as a system. These multielemental alloys can also be made in a non-equilibrium manner so that not only compositional disorder is produced, but also the desired local chemical order is formed. This revolutionary breakthrough has been made possible by considering the materials as a system and thereby utilizing chemical modifiers and the principles of disorder and local order, pioneered by Stanford R. Ovshinsky (one of the instant inventors), in such a way as to provide the necessary catalytic local order environments, such as surfaces and at the same time designing bulk characteristics for storage and high rate charge/discharge cycling. In other words, these principles allow for tailoring of the material by controlling the particle and grain size, topology, surface states, catalytic activity, microstructure, and total interactive environments for storage capacity.

The earliest work at atomic engineering of hydrogen storage materials is disclosed by Stanford R. Ovshinsky (one of the present inventors) in U.S. Pat. No. 4,623,597 ("the '597 patent"), the contents of which are incorporated by reference. Ovshinsky, described disordered multicomponent hydrogen storage materials for use as negative electrodes in electrochemical cells for the first time. In this patent, Ovshinsky describes how disordered materials can be tailor made to greatly increase hydrogen storage and reversibility characteristics. Such disordered materials are formed of one or more of amorphous, microcrystalline, intermediate range order, or polycrystalline (lacking long range compositional order) wherein the polycrystalline material may include one or more of topological, compositional, translational, and positional modification and disorder, which can be designed into the material. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily nonequilibrium metastable phases resulting in the high energy and power densities and low cost. The resulting low cost, high energy density disordered material allowed such Ovonic batteries to be utilized most advantageously as secondary batteries, but also as primary batteries and are used today worldwide under license from the assignee of the subject invention.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. The disordered material had the desired electronic configurations which resulted in a large number of active sites. The nature and number of storage sites was designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods therebetween resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of catalytically active sites for hydrogen dissociation and also of hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

The disorder described in the '597 patent can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

One advantage of the disordered materials of the '597 patent were their resistance to poisoning. Another advantage was their ability to be modified in a substantially continuous range of varying percentages of modifier elements. This ability allows the host matrix to be manipulated by modifiers to tailor-make or engineer hydrogen storage materials with all the desirable characteristics, i.e., high charging/discharging efficiency, high degree of reversibility, high electrical efficiency, long cycle life, high density energy storage, no poisoning and minimal structural change.

Until the advent of the instant invention, no one has applied Ovshinsky's atomic engineering principals to provide low temperature hydrogen storage alloys that are non-pyrophoric. Upon application of these principles to low temperature alloys, have provided a non-pyrophoric hydrogen-storage material. Specifically provided are low-temperature hydrogen storage alloys with acceptably high hydrogen storage capacity, cost-effective composition, reasonably high absorption/desorption hydrogen storage kinetics coupled with non-pyrophoricity.

SUMMARY OF THE INVENTION

This invention relates to alloys in which hydrogen may be stored, more particularly alloys known as "low temperature" hydrogen storage alloys or materials, and specifically to such alloys or materials which are non-pyrophoric on exposure to ambient atmosphere, even after hydride/dehydride cycling. Provided are alloy compositions, particularly low-temperature alloys, which have good hydrogen storage capacity, high absorption/desorption kinetics, and yet are not pyrophoric.

Generally the alloy comprises titanium, zirconium, vanadium, chromium, and manganese. The alloy may preferably further comprise iron and aluminum and may also contain 1–10 at. % total of at least one element selected from the group consisting of Ba, Co, Cu, Cs, K, Li, Mm, Mo, Na, Nb, Ni, Rb, Ta, Tl, and W (where Mm is misch metal). Specifically the low temperature hydrogen storage alloy comprises 0.5–10 at. % Zr, 29–35 at. % Ti, 10–15 at. % V, 13–20 at. % Cr, 32–38 at. % Mn, 1.5–3.0 at. % Fe, and 0.05–0.5 at. % Al. The alloy remains non-pyrophoric upon exposure to ambient atmosphere even after 400 hydrogen charge/discharge cycles, and preferably even after 1100 hydrogen charge/discharge cycles. The alloy has a hydrogen storage capacity of at least 1.5 weight percent, more preferably at least 1.8 weight percent, and most preferably at least 1.9 weight percent.

DETAILED DESCRIPTION OF THE INVENTION

Figure 1:
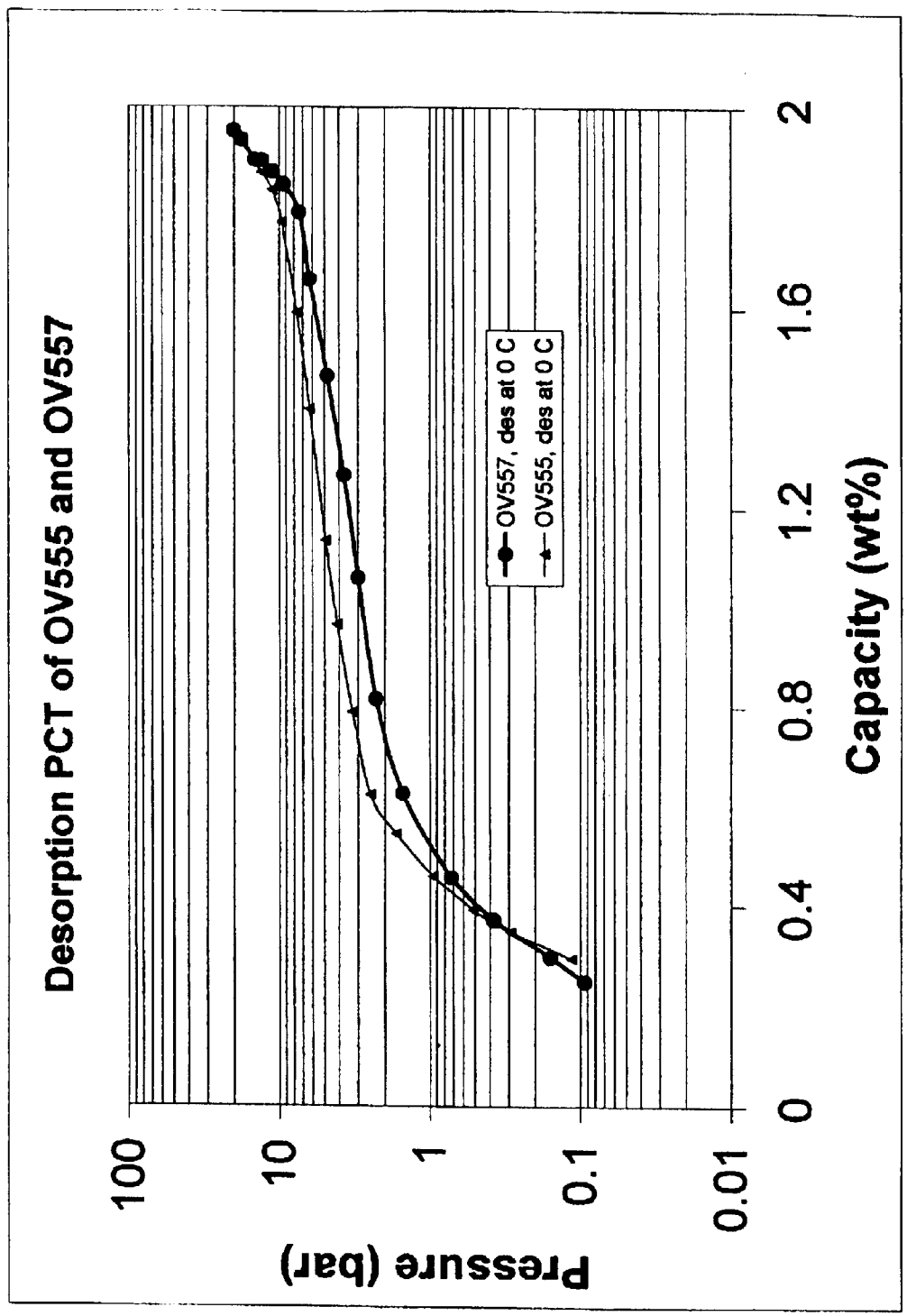
FIG. 1 is a graphic depiction of the desorption PCT curves of two non-pyrophoric alloys of the instant invention.

The instant invention provides for a low temperature hydrogen storage alloy which is non-pyrophoric upon exposure to ambient atmosphere. The alloy particularly is non-pyrophoric even after hydrogen charge/discharge cycling. To provide for such an alloy the inventors have created an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the instant alloy included adjusting the composition of the alloy to include increased chromium levels beyond that of conventional $TiMn_2$ alloys. That is, the inventors have found that as the chromium content of the alloy increases, the tendency to be pyrophoric decreases. Particularly preferred alloy compositions comprise 0.5–10 at. % Zr, 29–35 at. % Ti, 10–15 at. % V, 13–20 at. % Cr, 32–38 at. % Mn, 1.5–3.0 at. % Fe, and 0.05–0.5 at. % Al. Specific examples of useful alloys include the compositions $Zr_1Ti_{33}V_{12.54}Cr_{15}Mn_{36}Fe_{2.25}Al_{0.21}$ and $Zr_{1.5}Ti_{32.5}V_{12.54}Cr_{15}Mn_{36}Fe_{2.25}Al_{0.21}$.

With a view toward further atomic engineering of the alloy, particularly preferred embodiments may consist of the basic non-pyrophoric alloy which has been modified to create heterogeneity within the spectrum of hydride bond strengths, with one or more body-centered cubic structure by incorporation of at least one element selected from the group consisting of barium, cesium, potassium, lithium, molybdenum, sodium, niobium, rubidium, tantalum, thallium, and tungsten.

The alloys of the instant invention remain non-pyrophoric upon exposure to ambient atmosphere even after 400 hydrogen charge/discharge cycles and more preferably remain non-pyrophoric upon exposure to ambient atmosphere even after 1100 hydrogen charge/discharge cycles. The alloys have a hydrogen storage capacity of at least 1.5 weight percent, more preferably at least 1.8 weight percent and most preferably at least 1.9 weight percent.

EXAMPLES

In an effort to illuminate this invention, examples of various inventive and comparative alloys are provided below. These are provided with intent only to demonstrate specific alloys and their capabilities and must not be interpreted as being limiting scope or breadth of this invention in any manner. The true scope of this invention is described only in the claims following these examples.

Inventive Example 1

A first inventive hydrogen storage alloy (designated OV555) having the composition $Zr_1Ti_{33}V_{12.54}Cr_{15}Mn_{36}Fe_{2.25}Al_{0.21}$ (all atomic subscripts are based upon a total of 100 atoms) was made by melting and casting into an ingot. The alloy was comminuted by crushing followed by successive hydriding and dehydriding cycles. The material was allowed to outgas to evolve and release as much hydrogen as possible. Several grams of the outgassed powder were poured in a cascade through ambient atmosphere from a height of about 75 cm into a metal bucket having open diameter of about 30 cm. The powder warmed considerably and began to glow but did not ignite. The test was repeated with the same results.

Inventive Example 2

A second inventive hydrogen storage alloy (designated OV557) having the composition $Zr_{1.5}Ti_{32.5}V_{12.5}Cr_{15}Mn_{36}Fe_{2.25}Al_{0.21}$ (all atomic subscripts are based upon a total of 100 atoms) was made by melting and casting into an ingot. The alloy was comminuted by crushing followed by successive hydriding and dehydriding cycles. The material was allowed to outgas to evolve and release as much hydrogen as possible. The material was tested according to the same procedure as was the material in Inventive Example 1. Thus, several grams of the outgassed powder were poured in a cascade through ambient atmosphere from a height of about 75 cm into a metal bucket having open diameter of about 30 cm. The powder did warm considerably and began to glow but did not ignite. The test was repeated with the same results.

FIG. 1 is a graphic depiction of the desorption PCT curves of the two inventive materials OV555 (symbol ▲) and OV557 (symbol ●) at 0° C. The two inventive alloys demonstrate an absorption maximum of about 1.9 wt. %. As can be seen, the inventive alloys have a sloped plateau pressure that ranges from about 2 to about 10 bar. This sloped plateau pressure is indicative of the heterogeneous spectrum of hydrogen bonding energies that exist in the inventive alloys.

Figure 2:
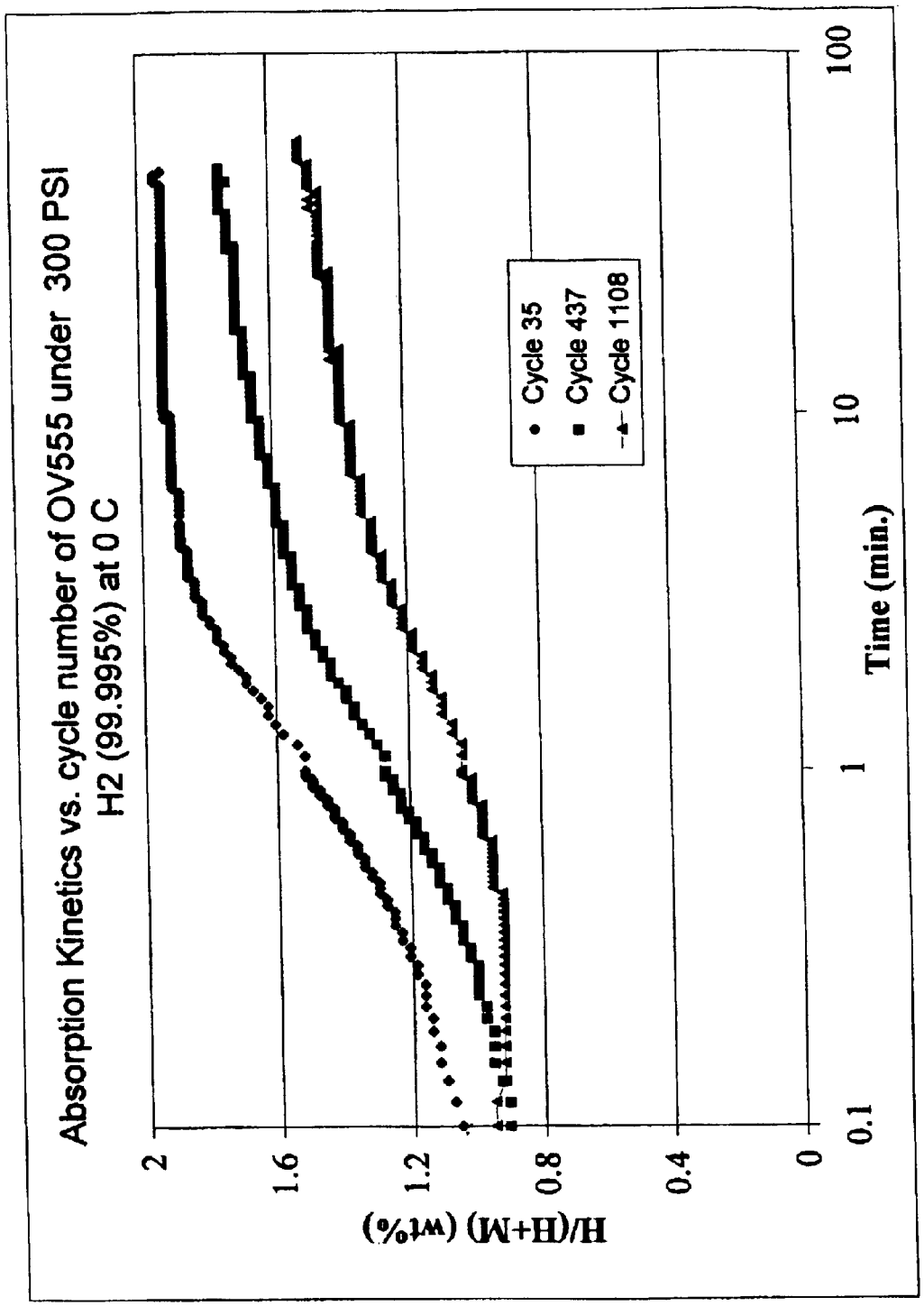
FIG. 2 is a graphic depiction of the absorption kinetics of one non-pyrophoric alloy of the instant invention at 35, 437, and 1108 hydride/dehydride cycles.

FIG. 2 is a graphic depiction of the absorption kinetics of inventive alloy OV555 at 35 (symbol ♦), 437 (symbol ■), and 1108 (symbol ▲) hydride/dehydride cycles. The data was taken at a hydrogen pressure of 300 pounds per square inch and at 0° C. As can be seen, the kinetics have remained relatively constant (shape of the curve), but the capacity has decreased somewhat. This decrease in capacity is due to contamination of the alloy by impurities (particularly oxygen and water vapor) in the hydrogen used for cycling (i.e. the hydrogen is only 99.995% pure). This is confirmed by the decrease in capacity of the comparative alloys, indicated in FIG. 4. The alloy has very good absorption kinetics, reaching at least 80% of it's maximum absorption within 1 minute.

Comparative Example 3

A first comparative hydrogen storage alloy (designated OV56) having the composition $Zr_{4.35}Ti_{29.5}V_{5.75}Cr_{6.35}Mn_{43.9}Fe_{8.15}Al_{2.0}$ (all atomic subscripts are based upon a total of 100 atoms) was made by melting and casting into an ingot. The alloy was comminuted by crushing followed by successive hydriding and dehydriding cycles. The material was allowed to outgas to evolve and release as much hydrogen as possible. Several grams of the outgassed powder were poured in a cascade through ambient atmosphere from a height of about 75 cm into a metal bucket having open diameter of about 30 cm. The powder did warm considerably and began glowing, sparking and igniting during its fall.

Comparative Example 4

A second comparative hydrogen storage alloy (designated OV539) having the composition $Zr_{3.63}Ti_{29.8}V_{8.82}Cr_{9.85}Mn_{39.5}Fe_5Al_{1.0}Ni_2Mm_{0.4}$ (all atomic subscripts are based upon a total of 100 atoms) was made by melting and casting into an ingot. The alloy was comminuted by crushing followed by successive hydriding and dehydriding cycles. The material was allowed to outgas to evolve and release as much hydrogen as possible. Several grams of the outgassed powder were poured in a cascade through ambient atmosphere from a height of about 75 cm into a metal bucket having open diameter of about 30 cm. The powder did warm considerably and began glowing, sparking and igniting during its fall.

Figure 3:
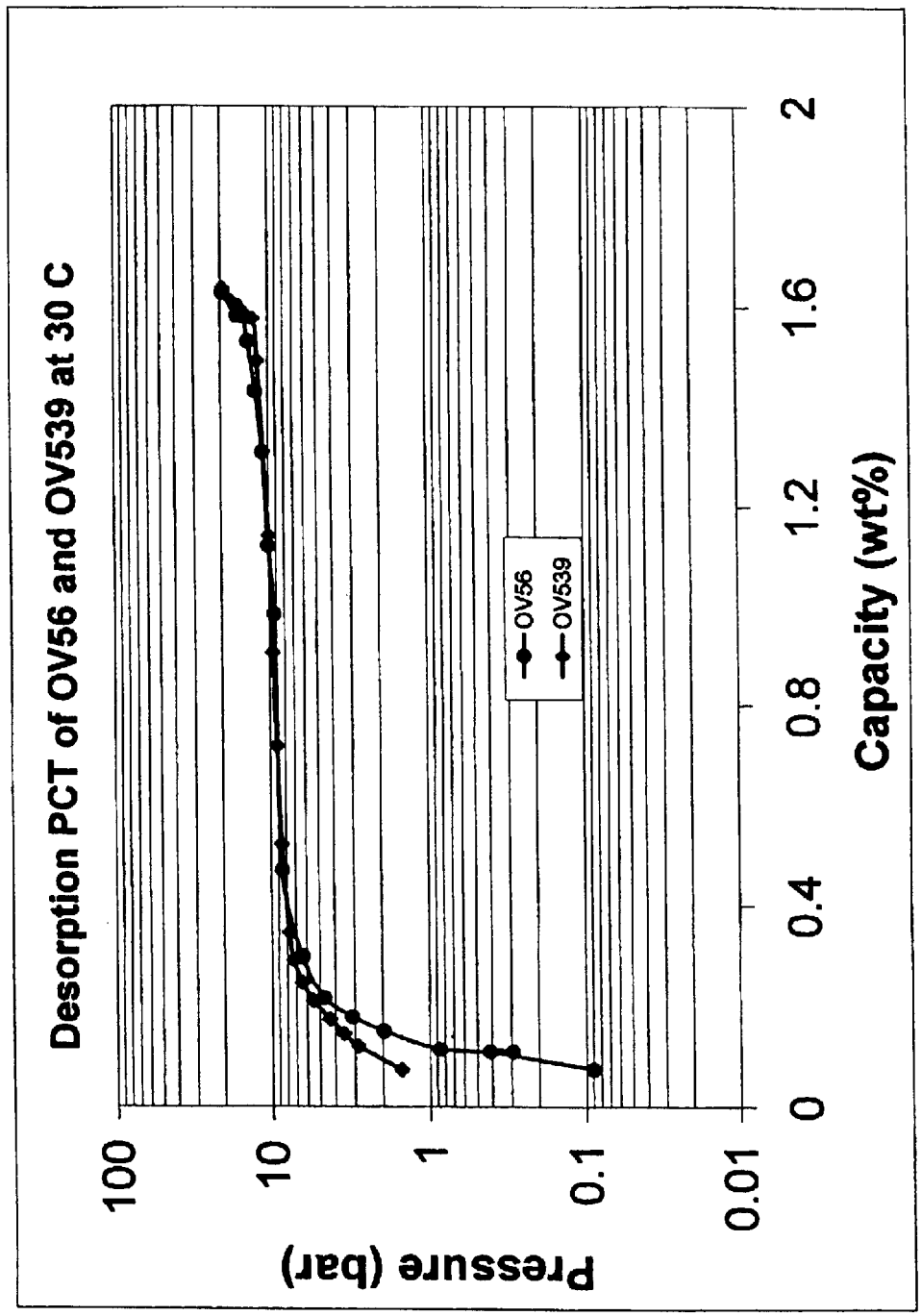
FIG. 3 is a graphic depictions of the desorption PCT curves of the two comparative (pyrophoric) alloys.

FIG. 3 is a graphic depictions of the desorption PCT curves of the two comparative examples, OV56 (symbol ●) and OV539 (symbol ♦) at 30° C. As may be noted both samples in FIG. 3 (pyrophoric materials) reach a capacity of about 1.6 wt % at 30° C. (higher capacity is, seen at 0° C). These comparative alloys have a fairly flat plateau pressure during which most of the desorption occurs near about 10 bar. This indicates that the comparative alloys do not have a heterogeneous range of hydrogen bonding strengths.

Figure 4:
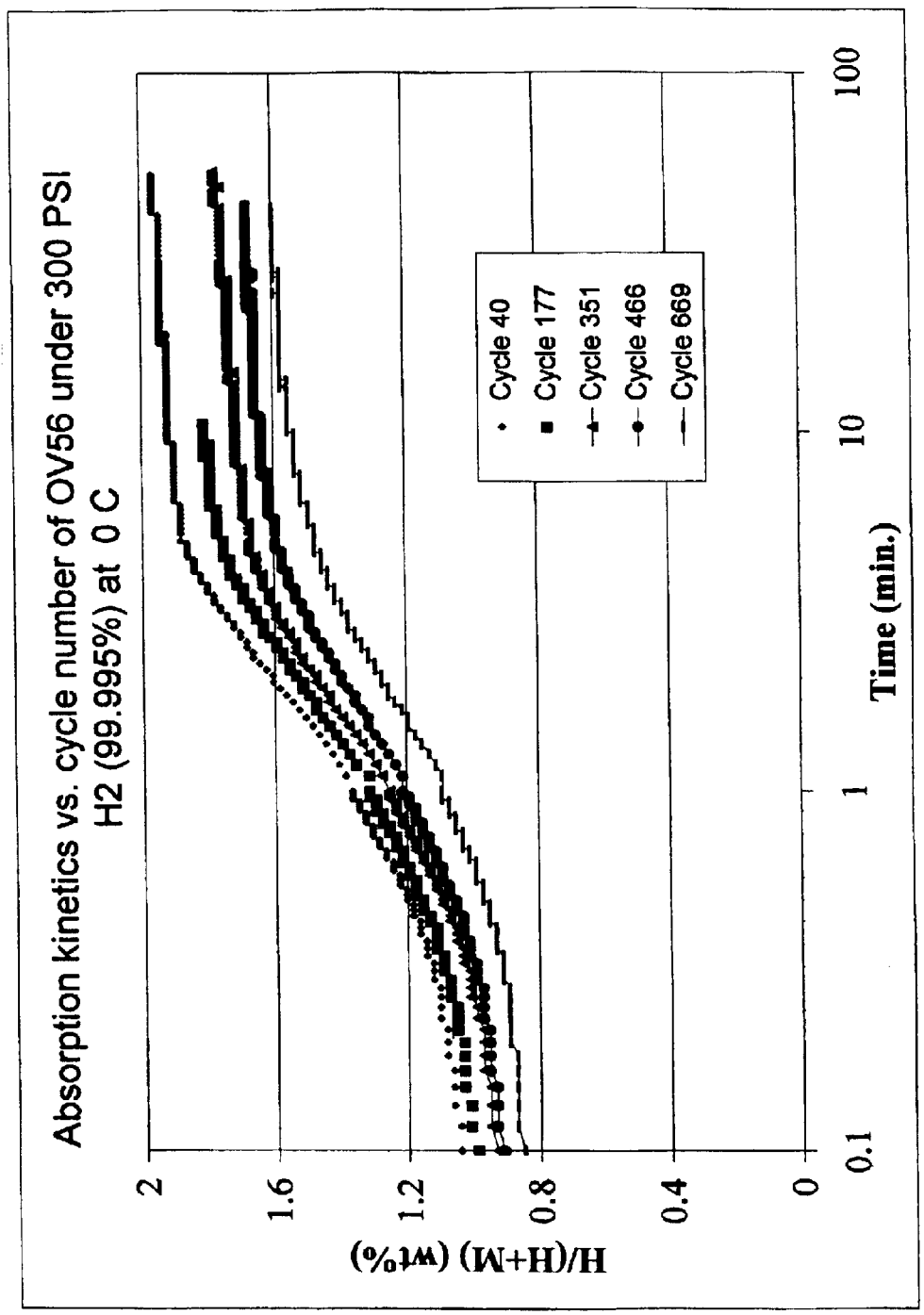
FIG. 4 is a graphic depiction of the absorption kinetics of comparative alloy OV56 at 40, 177, 351, 466, and 669 hydride/dehydride cycles.

FIG. 4 is a graphic depiction of the absorption kinetics of comparative alloy OV56 at 40 (symbol ♦), 177 (symbol ■), 351 (symbol ▲), 466 (symbol), and 669 (symbol) hydride/dehydride cycles. The data was taken at a hydrogen pressure of 300 pounds per square inch and at 0° C. As can be seen, the kinetics have remained relatively constant (shape of the curve), but the capacity has decreased somewhat. Again, this decrease in capacity is due to contamination of the alloy by impurities in the hydrogen used for cycling.

Another form of atomic engineering for these alloys may be accomplished is through vehicle of adjusting various aspects of the TiMn$_2$-type alloy. The alloy structure may be adjusted by modification of the A to B ratios away from the stoichiometric ratio of 1:2. Such as, for example $AB_{1.95}$ or $AB_{2.05}$.

As noted earlier, these examples are provided only for convenience, demonstration of capability of specific alloys, and general clarification of alloys of this invention. They are not to be construed in a manner to limit the invention, whose sole limitations are described in the immediately following claims.

What is claimed is:

1. A low temperature hydrogen storage alloy comprising one or more BCC structures which is not pyrophoric upon exposure to ambient atmosphere even after hydrogen charge/discharge cycling comprising:

15–30 at. % Cr; and

32–38 at. % Mn.

2. The low temperature hydrogen storage alloy, of claim 1, wherein said alloy further comprises titanium, zirconium, and vanadium.

3. The low temperature hydrogen storage alloy of claim 1, wherein said alloy further comprises iron and aluminum.

4. The low temperature hydrogen storage alloy of claim 1, wherein said alloy further comprises at least one element selected from the group consisting of Ba, Co, Cu, Cs, K, Li, Mm, Mo, Na, Nb, Ni, Rb, Ta, Ti, and W.

5. The low temperature hydrogen storage alloy of claim 1, wherein said alloy remains non-pyrophoric upon exposure to ambient atmosphere even after 400 hydrogen charge/discharge cycles.

6. The low temperature hydrogen storage alloy of claim 1, wherein said alloy remains non-pyrophoric upon exposure to ambient atmosphere even after 1100 hydrogen charge/discharge cycles.

7. The low temperature hydrogen storage alloy of claim 1, wherein said alloy has a hydrogen storage capacity of at least 1.5 weight percent.

8. The low temperature hydrogen storage alloy of claim 1, wherein said alloy has a hydrogen storage capacity of at least 1.8 weight percent.

9. The low temperature hydrogen storage alloy of claim 1, wherein said alloy has a hydrogen storage capacity of at least 1.9 weight percent.

10. A low temperature hydrogen storage alloy which is not pyrophoric upon exposure to ambient atmosphere even after hydrogen charge/discharge cycling comprising:

15–20 atomic percent chromium;

32 to 38 atomic percent manganese; and at least one modifer element selected from Ba, Co, Cu, Cr, Cs, K, Li, Mm, Mo, Na, Nb, Ni, Rb, Ta, Ti, and W;

said ahoy having one or more body-centered cubic structures formed by incorporating into the alloy said at least one modifier element.

11. The low temperature hydrogen storage alloy of claim 10, wherein said alloy comprises 1–10 at. % total of said at least one modifier element.

12. The low temperature hydrogen storage alloy of claim 10, wherein said alloy further comprises titanium, zirconium, and vanadium.

13. The low temperature hydrogen storage alloy of claim 10, wherein said alloy further comprises iron and aluminum.

14. The low temperature hydrogen storage alloy of claim 10, wherein said alloy remains non-pyrophoric upon exposure to ambient atmosphere even after 400 hydrogen charge/discharge cycles.

15. The low temperature hydrogen storage alloy of claim 10, wherein said alloy remains non-pyrophoric upon exposure to ambient atmosphere even after 1100 hydrogen charge/discharge cycles.

16. The low temperature hydrogen storage alloy of claim 10, wherein said alloy has a hydrogen storage capacity of at least 1.5 weight percent.

17. The low temperature hydrogen storage alloy of claim 10, wherein said alloy has a hydrogen storage capacity of at least 1.8 weight percent.

18. The low temperature hydrogen storage alloy of claim 10, wherein said alloy has a hydrogen storage capacity of at least 1.9 weight percent.

* * * * *